United States Patent [19]

Ichinose et al.

[11] Patent Number: 5,422,537
[45] Date of Patent: Jun. 6, 1995

[54] ILLUMINATION UNIT AND IMAGE READING APPARATUS

[75] Inventors: Shuuichi Ichinose; Tadayuki Inaoka, both of Suwa, Japan

[73] Assignee: Seiko Epson Corporation, Tokyo, Japan

[21] Appl. No.: 66,084

[22] PCT Filed: Sep. 25, 1992

[86] PCT No.: PCT/JP92/01228

§ 371 Date: May 26, 1993

§ 102(e) Date: May 26, 1993

[87] PCT Pub. No.: WO93/06616

PCT Pub. Date: Apr. 1, 1993

[30] Foreign Application Priority Data

Sep. 26, 1991 [JP] Japan ................... 3-247313
Nov. 1, 1991 [JP] Japan ................... 3-287791
Jun. 18, 1992 [JP] Japan ................... 4-159425

[51] Int. Cl.[6] .............................................. H01J 63/06
[52] U.S. Cl. ............................................ 313/483
[58] Field of Search ............. 358/400, 406, 475, 474, 358/480, 485; H04N 1/04; 313/483, 485, 495, 496, 497, 422, 513, 581; 348/216, 234

[56] References Cited

U.S. PATENT DOCUMENTS

| 3,833,761 | 9/1974 | Houck | 358/475 |
| 4,703,231 | 10/1987 | Tomii | 315/366 |
| 4,733,139 | 3/1988 | Morimoto | 313/422 |
| 4,891,552 | 1/1990 | Moriyama | 313/495 |
| 4,935,767 | 6/1990 | Sangyoji | 355/20 |

FOREIGN PATENT DOCUMENTS

| 0333079 | 9/1989 | European Pat. Off. | H01J 63/06 |
| 56-73970 | 6/1981 | Japan . | |
| 59-139544 | 8/1984 | Japan . | |
| 60-100360 | 6/1985 | Japan . | |
| 2-181357 | 7/1990 | Japan . | |

*Primary Examiner*—Stephen Brinich
*Assistant Examiner*—Jerome Grant
*Attorney, Agent, or Firm*—Ladas & Parry

[57] ABSTRACT

An illumination unit large in the quantity of light, compact in size and simple in construction without being susceptible to change in ambient temperature is disclosed. In the unit, a cathode 1 for emitting electrons, an anode 3 for accelerating the emitted electrons, fluorescent substances 4G, 4R and 4B for emitting luminescence due to collision of the electrons thereagainst are provided within an air-tightly closed vacuum vessel 20. Further, back electrodes 2G, 2R and 2B for controlling the electron emission area are arranged in the vicinity of the cathode 1.

5 Claims, 14 Drawing Sheets

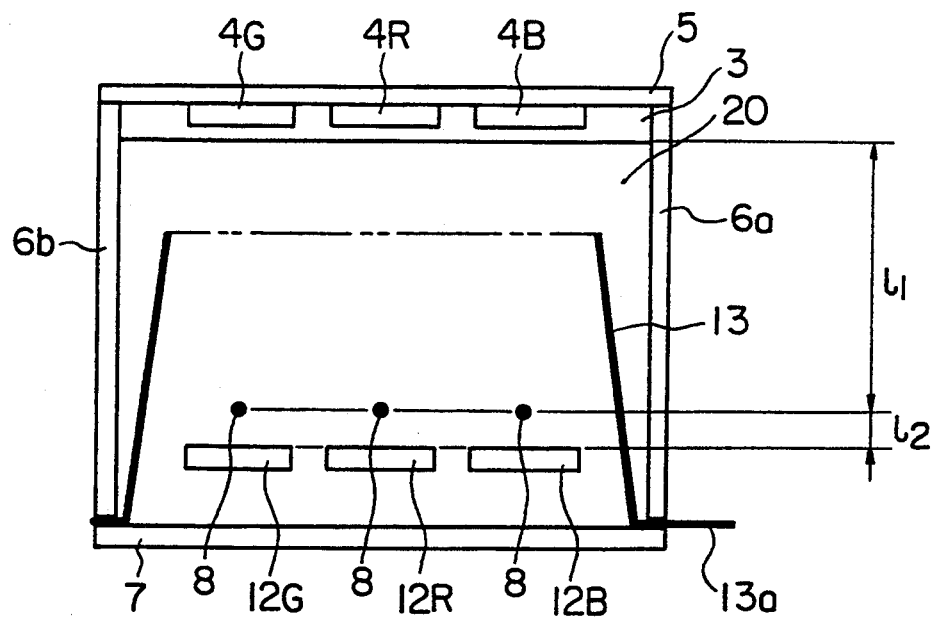
F I G. 8
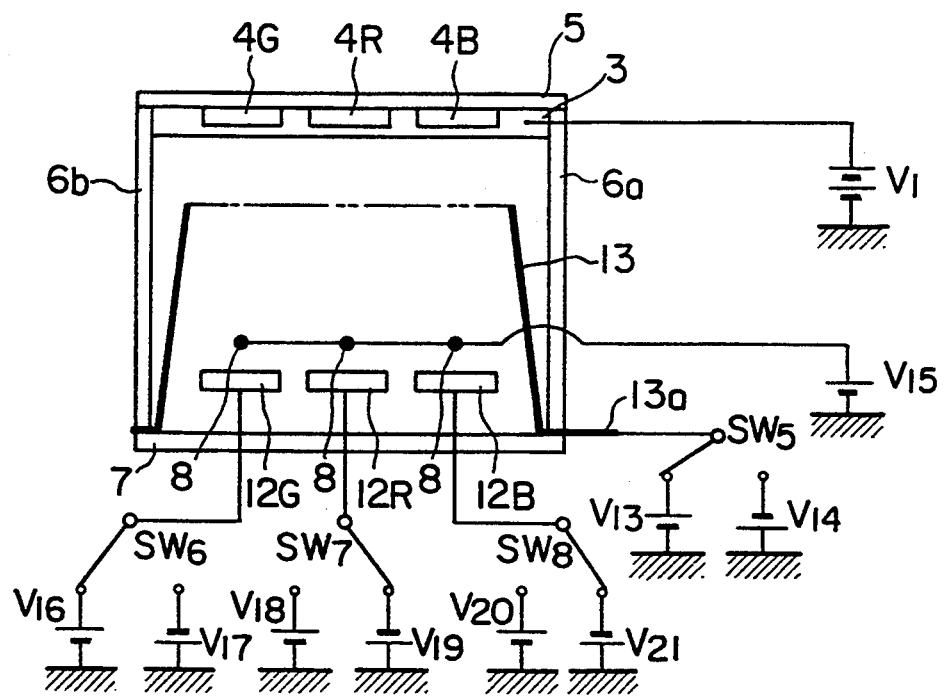
F I G. 9

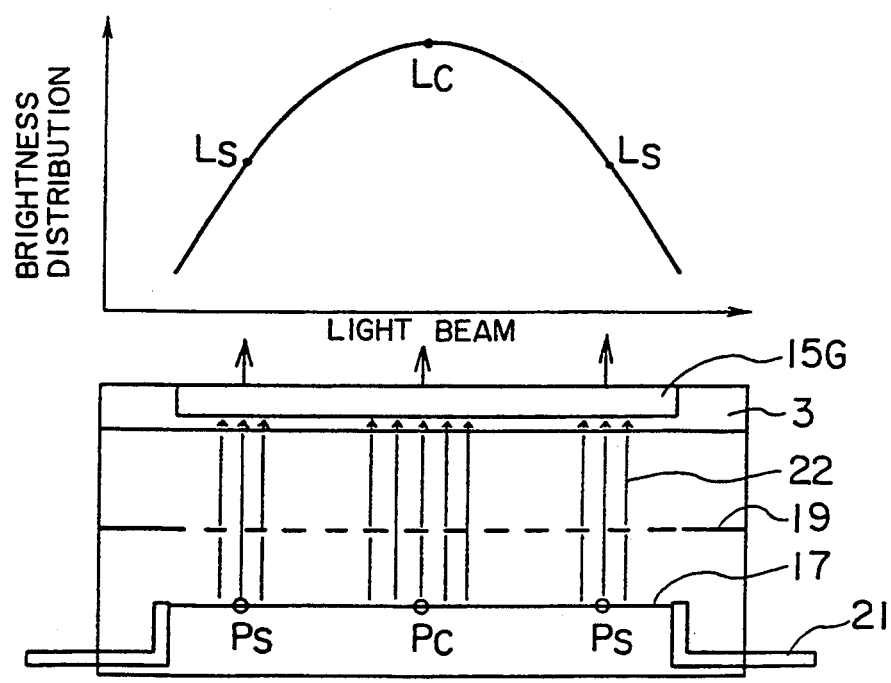
F I G. 16
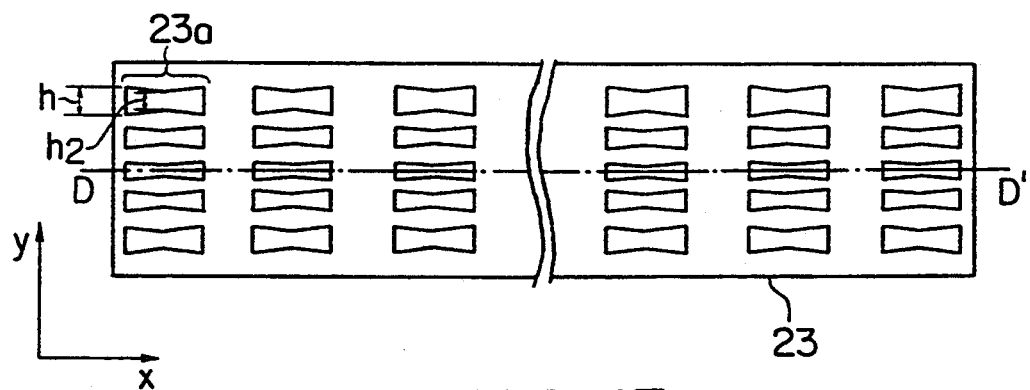
F I G. 17

ILLUMINATION UNIT AND IMAGE READING APPARATUS

TECHNICAL FIELD

The present invention relates to an illumination unit and an image reading apparatus using the same illumination unit, suitable for use in an image scanner, digital copying machine, facsimile, etc. to read images into a computer, mainly.

BACKGROUND ART

An example of prior art image reading apparatus is disclosed in Japanese Published Unexamined (Kokai) Patent Application No. 54-81715, for instance. FIG. 23 is a perspective view showing the prior art image reading apparatus disclosed in this document, and FIG. 24 is a cross-sectional view showing the carriage thereof, taken along the line B—B' in FIG. 23. In FIG. 24, an illumination unit 36 is composed of three image illuminating mercury fluorescent lamps of a red mercury fluorescent lamp 37, a green mercury fluorescent lamp 38, and a blue mercury fluorescent lamp 39, each having a predetermined distribution of spectral radiant energy and three voltage sources (not shown) for turning on respective lamps. These three red, green and blue mercury fluorescent lamps 37, 38 and 39 are turned on periodically and independently in sequence to illuminate an object 28 to be image read. The light reflected by the object 28 is image-formed on a line sensor 34 composed of a plurality of light-electricity transducing elements, through a reduction lens 33, in order to read the image by detecting chrominance signals, in sequence.

In the prior art fluorescent lamps, since the evaporation pressure of the mercury enclosed inside fluctuates according to ambient temperature, there exists a problem in that the quantity of light fluctuates according to the ambient temperature. In addition, in the case of the fluorescent lamp, the quantity of light obtainable is inevitably limited and further an appropriate tube diameter of the lamp is as large as 40 mm to maximize the luminous efficiency. Therefore, the volume of the three fluorescent lamps which constitute the color image scanner is large, and thereby it has been difficult to reduce the size of the illumination unit.

In addition to the above-mentioned problem, the prior art method involves another problem in the case where an object having sloped portions as with the case of an opened book is image read. In more detail, with reference to FIG. 25, when an object 28 having sloped portions is placed on a table 27 for image reading, the shade of colors which are not actually exist (referred to as shear in color image) is produced, thus resulting in a problem in that the color reproducibility is deteriorated markedly.

The causes of the above-mentioned problem are described in further details with reference to FIG. 25. When taking into account a point A at which the object 28 is not parallel to the table 27, the object at point A is illuminated sufficiently by the light emitted from the green and blue mercury fluorescent lamps 38 and 39, but not illuminated sufficiently by the light emitted from the red mercury fluorescent lamp 37. This is because the angle of incidence of light emitted from the red mercury fluorescent lamp 37 upon the object is small at point A. Therefore, in the case where the color of the object at point A is white, in spite of the fact that the quantity of light reflected from the object at point A must be equal to each other in the three colors of red, green and blue emitted by the respective mercury fluorescent lamps so that the line sensor 34 can generate the red, green and blue color output signals at the same level, since the red light emitted from the red mercury fluorescent lamp 37 is not sufficient at point A, the red color signal output of the line sensor 34 is low, with the result that the color at point A is reproduced in a purplish blue color.

In other words, the above-mentioned phenomenon occurs due to the fact that the spread angle a of mercury fluorescent lamp relative to an object, that is, the angle between the red mercury fluorescent lamp 37 and the blue mercury fluorescent lamp 39 obtained when seen from any given position on the object to be read is as large as 100 to 120 degrees in the case of the prior art illumination unit. The above-mentioned problem may be solved by collecting the three mercury fluorescent lamps at the same position to reduce the spread angle a to the object. In the case of the prior art illumination unit, however, since the optimum diameter of the fluorescent lamp is as large as 40 mm, it has been difficult to arrange the three fluorescent lamps at the same position.

Further, in the prior art illumination unit, since the three lamps are turned on periodically and independently in sequence, it is impossible to use the same single lamp activating power source, in common for the three lamps. As a result, when the prior art illumination unit is mounted on the carriage 35 of the image reading apparatus, a large space is inevitably required. In addition, since the carriage 35 is moved by the distance corresponding to the image-reading dimension of the object, there exists a problem in that the size of the image reading apparatus itself is inevitably increased to that extent.

DISCLOSURE OF THE INVENTION

An object of the present invention is to provide an illumination unit stable in the quantity of illumination light without being susceptible to change in ambient temperature.

Another object of the present invention is to provide an illumination unit compact in size and large in light emission capability.

Further, the object of the present invention is to provide a color image reading apparatus compact in size.

Another object of the present invention is to provide a color image reading apparatus provided with an illumination unit high in color reproducibility, without causing any shear in color image reading, even when an image having stepped portions as with the case of an opened book is image read.

To achieve the above-mentioned object, the present invention provides an illumination unit which comprises within an air-tightly closed vacuum vessel: a cathode for emitting electrons by application of a first predetermined voltage; an anode for accelerating the electrons emitted by said cathode by application of a second voltage higher than the first voltage; and a fluorescent substance for emitting cathode luminescence light caused by collision of the accelerated electrons thereagainst.

Further, the present invention provides an illumination unit which comprises within an air-tightly closed vacuum vessel: a cathode for emitting electrons by application of a first predetermined voltage; an anode for accelerating the emitted electrons by application of a second-predetermined voltage higher that the first voltage; a plurality of fluorescent substances for emitting cathode luminescence light caused by collision of the accelerated electrons thereagainst; and a deflection electrode for deflecting a travel direction of the emitted electrons by application of a third voltage higher than the first voltage but lower than the second voltage, the third voltage being so controlled that the electrons are directed to any one of a plurality of the fluorescent substances.

Further, the present invention provides an image reading apparatus provided with the above-mentioned illumination unit.

BRIEF DESCRIPTION OF THE DRAWINGS

FIG. 8 is a cross-sectional view taken along the line A—A' shown in FIG. 7;

FIG. 9 is a diagram showing a circuit for activating the third embodiment of the illumination unit;

FIG. 16 is a graphical representation showing the brightness distribution on the light generating surface obtained when electrons are controlled by use of a grid 19 formed with three openings of the same opening areas $S_1$, $S_2$, and $S_3$;

FIG. 17 is a front view showing a grid 23 of a seventh embodiment of the illumination unit;

BEST MODES FOR EMBODYING THE INVENTION

Figure 1:
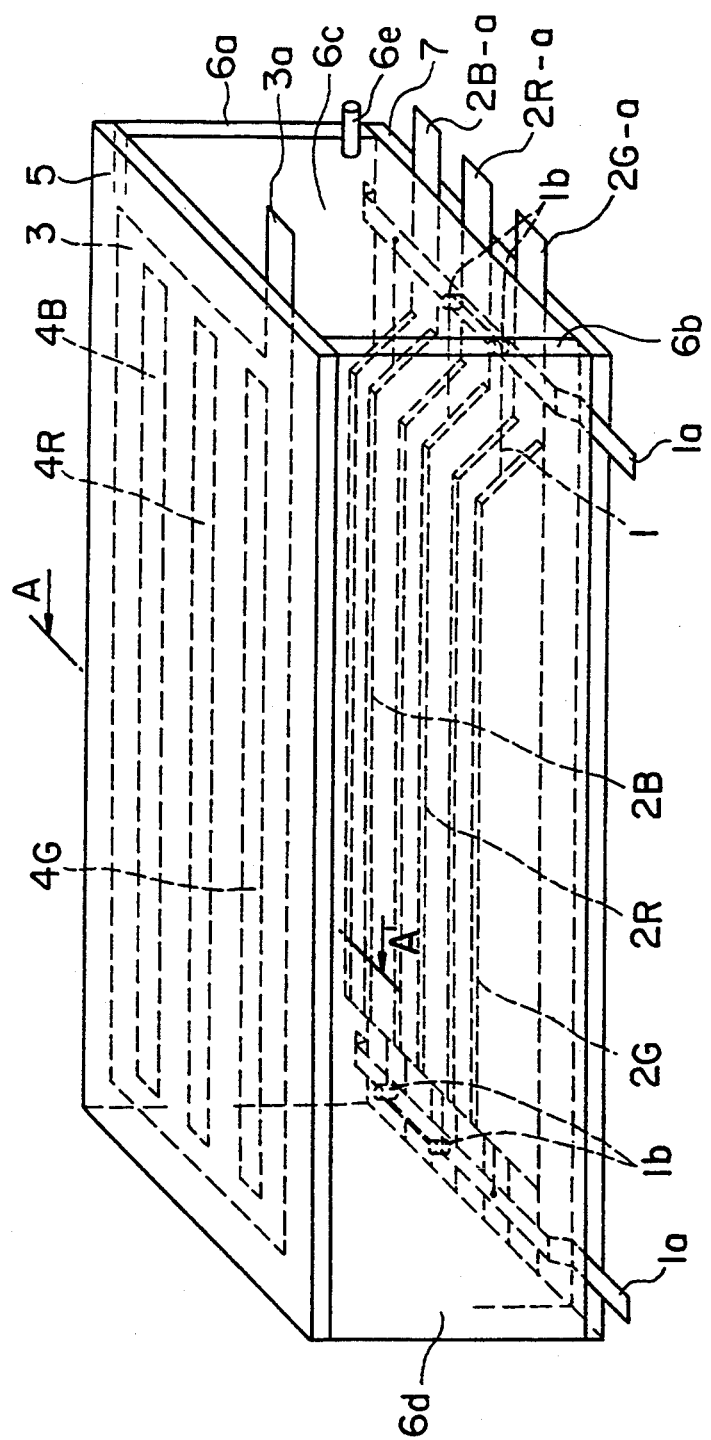
FIG. 1 is a perspective view showing a first embodiment of the illumination unit according to the present invention.
Figure 2:
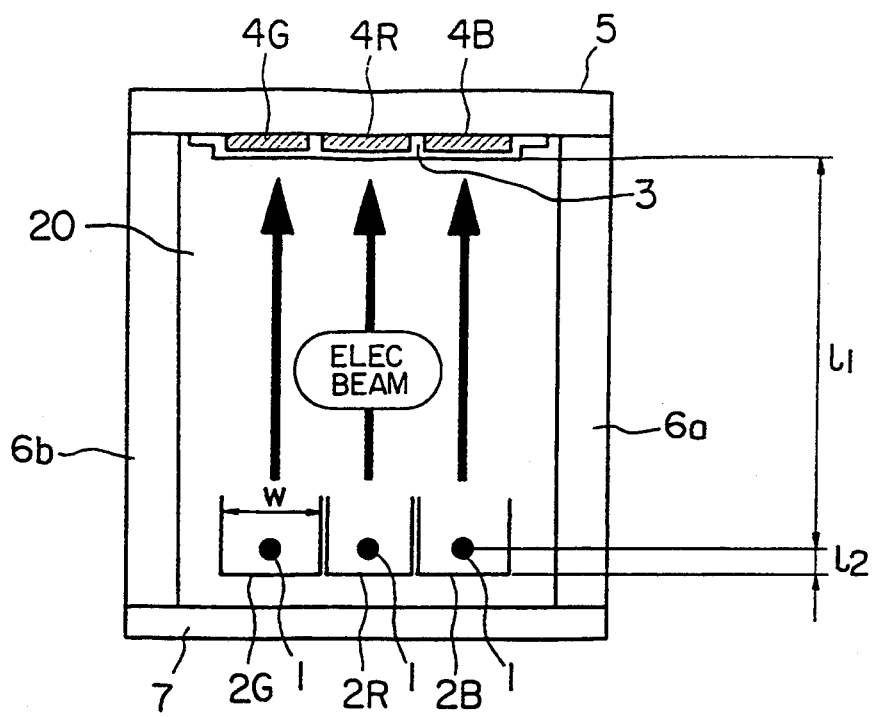
FIG. 2 is a cross-sectional view taken along the line A—A' shown in FIG. 1.

FIG. 1 is a perspective view showing a first embodiment of the illumination unit according to the present invention; and FIG. 2 is a cross-sectional view taken along the line A—A' shown in FIG. 1. The detailed construction of the illumination unit will be described hereinbelow with reference to FIG. 1.

A cathode 1 is fine wire made of tungsten and having a diameter from 5 to 50 μm. The surface of the cathode is covered with an electron emitting substance such as barium oxide (not shown) to increase the thermoelectron emission efficiency. This cathode 1 is formed by stretching a single cathode wire into S-shape with cathode returning poles 1b disposed on two cathode fixing members 1a. In the above-mentioned construction, the cathode can be stretched in a single process, fixed by a pair of electrodes, and formed easily even when a narrow light emitting width is needed. Further, the fluorescent substances of three different light colors 4R, 4G and 4B are applied onto the lower surface of an upper plate 5 made of transparent glass into a rectangular shape, by screen printing method, for instance. The fluorescent substances are of materials able to generate cathode luminescence such as $Y_2O_2S$:Eu, Sm for red color, ZnS:Cu, Al for green color, and ZnS:Ag, Al for blue color, in practice. A color linear light source of three primary colors can be composed by using these fluorescent substances. The switching speed of the emitted light colors of this illumination unit can be determined on the basis of the afterglow time of the fluorescent substances. The afterglow time of the cathode luminescence is short; that is, in the case of the green fluorescent material 4G and the blue fluorescent material 4B, the afterglow time is 0.1 msec or less and in the case of the red fluorescent material 4R, the afterglow time is about 1 msec. The powders of these fluorescent substances are applied uniformly at a rate of 1 to 10 mg/cm$^2$, and an anode 3 made of aluminum and having a thickness of 0.1 and 0.4 μm is formed on the applied fluorescent substances through the process of vapor deposition.

Three back electrodes 2G, 2R and 2B are formed and arranged by bending into a U-shape a conductive and non-magnetic material such as brass or aluminum. The gap distance 12 between the respective back electrodes 2G, 2R and 2B and the cathode 1 is about 0.1 mm. By reducing the gap distance, it is possible to decrease the respective voltages applied to the respective back electrodes 2G, 2R and 2B.

As shown in FIG. 2, a vacuum vessel 20 is formed by an upper plate 5 to which the three fluorescent substances 4R, 4G and 4B are applied, two side plates 6a and 6b, a bottom plate 7, and other side plates 6c and 6d shown in FIG. 1, and evacuated down to a vacuum of 5 $10^{-5}$ to $10^{-8}$ Torr through an exhaust pipe 6e. Further, the material of the upper plate 5 is lead or glass, for instance.

Figure 3:
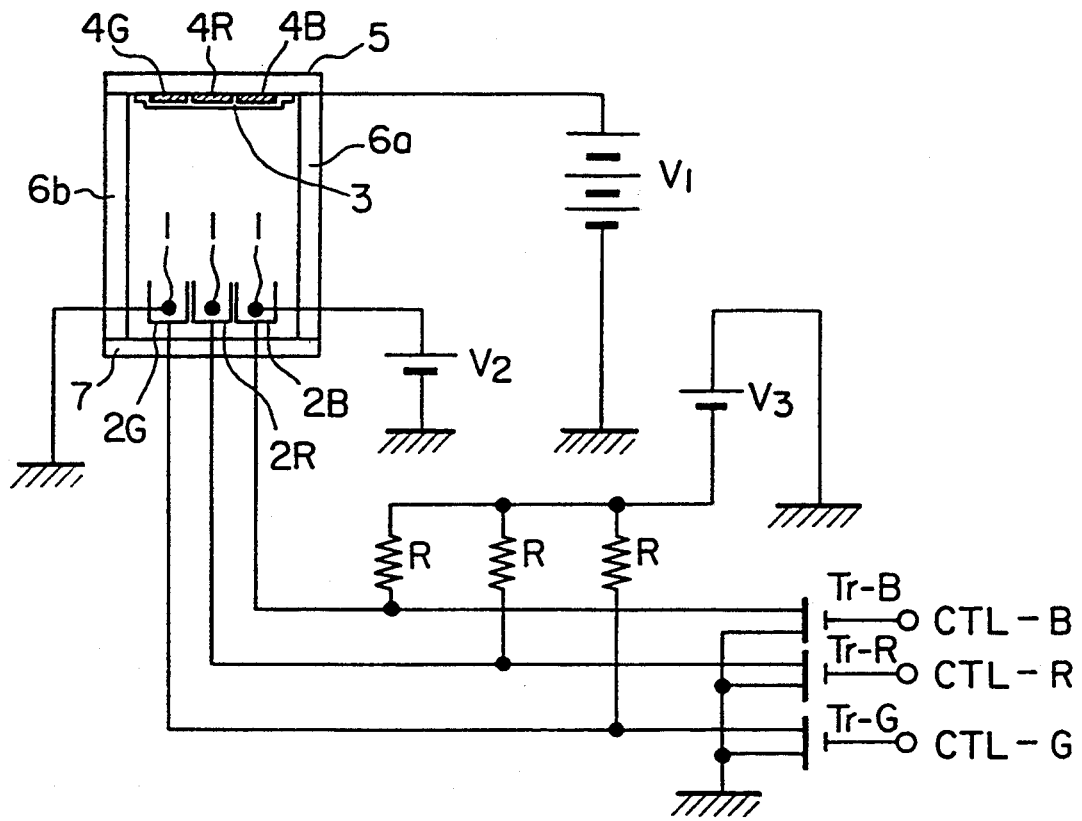
FIG. 3 is a diagram showing a circuit for activating the first embodiment of the illumination unit.

The operation of the illumination unit as described above will be described hereinbelow, with reference to FIG. 3 which shows a circuit for activating the illumination unit. Here, only the light emission control of the green fluorescent substance 4G will be described hereinbelow by way of example.

To the anode 3, a direct current voltage $V_1$ of 5 to 30 kV, most preferably of 10 kV is applied through a lead terminal 3a as shown in FIG. 1. On the other hand, to the cathode 1, a voltage $V_2$ is applied through a lead terminal 1a shown in FIG. 1. Thermoelectrons generated from the cathode by Joule heat are attracted and accelerated toward the anode 3 by an electric field generated by the anode voltage $V_1$.

When the green light is emitted, a control signal is applied to a terminal CTL-G from a control means (not shown) to turn on a transistor Tr-G. The transistor Tr-G is connected to the green back electrode 2G by a lead terminal 2G-a shown in FIG. 1. Therefore, the electric potential of the green back electrode 2G is the-same as that of the cathode 1, because both are connected to each other via the lead terminal 1a shown in FIG. 1. The thermoelectrons emitted from the cathode 1 are accelerated to the anode 3, and further passed through the anode 3 to excite the fluorescent substance 4G.

Further, the light emission area on the fluorescent substance can be roughly determined by the U-shaped opening width W of the green back electrode 2G shown in FIG. 2. For instance, when the green back electrode 2G having a 2 mm wide opening is used, the light emission area of the green fluorescent substance 4G is also 2 mm in width.

Further, it is possible to make uniform the light emission on the fluorescent surface by providing the back electrode. This is because the density of current applied to the fluorescent substance can be averaged. A large effect can be obtained by making the current density uniform, because it is possible to eliminate the local deterioration of the fluorescent substance and further to retain the original performance of the substance for many hours. Further, where the light emission is uniform all over the fluorescent substance, it is possible to obtain an illumination unit of uniform light emission.

When the illumination unit is not activated, a control signal is applied from the control means to the terminal CTL-G, so that the transistor Tr-G is turned off and therefore a voltage $V_3$ is applied to the green back electrode 2G via a resistor R. As a result, the flow of the thermoelectrons from the cathode 1, that is, the anode current is influenced. Namely, when an appropriate negative voltage $V_3$ is selected, the anode current becomes zero, perfectly. In an experiment, the distance $l_1$ between the cathode 1 and the anode 3 shown in FIG. 2 was 30 mm; the anode voltage $V_1$, 10 kV; and the green back electrode voltage $V_3$ was $-40$ V. The shorter a distance $l_2$ shown in FIG. 2 is, by the lower voltage will be controlled this back electrode voltage $V_3$.

The back electrode voltage required to cut off the anode current can be obtained on the basis of the calculation of the field strength in accordance with the following equation:

$$V_3 = -l_2/l_1 \cdot V_1$$

In the same way as described above, it is possible to control the light emission of the three kinds of fluorescent substances, independently.

Figure 4:
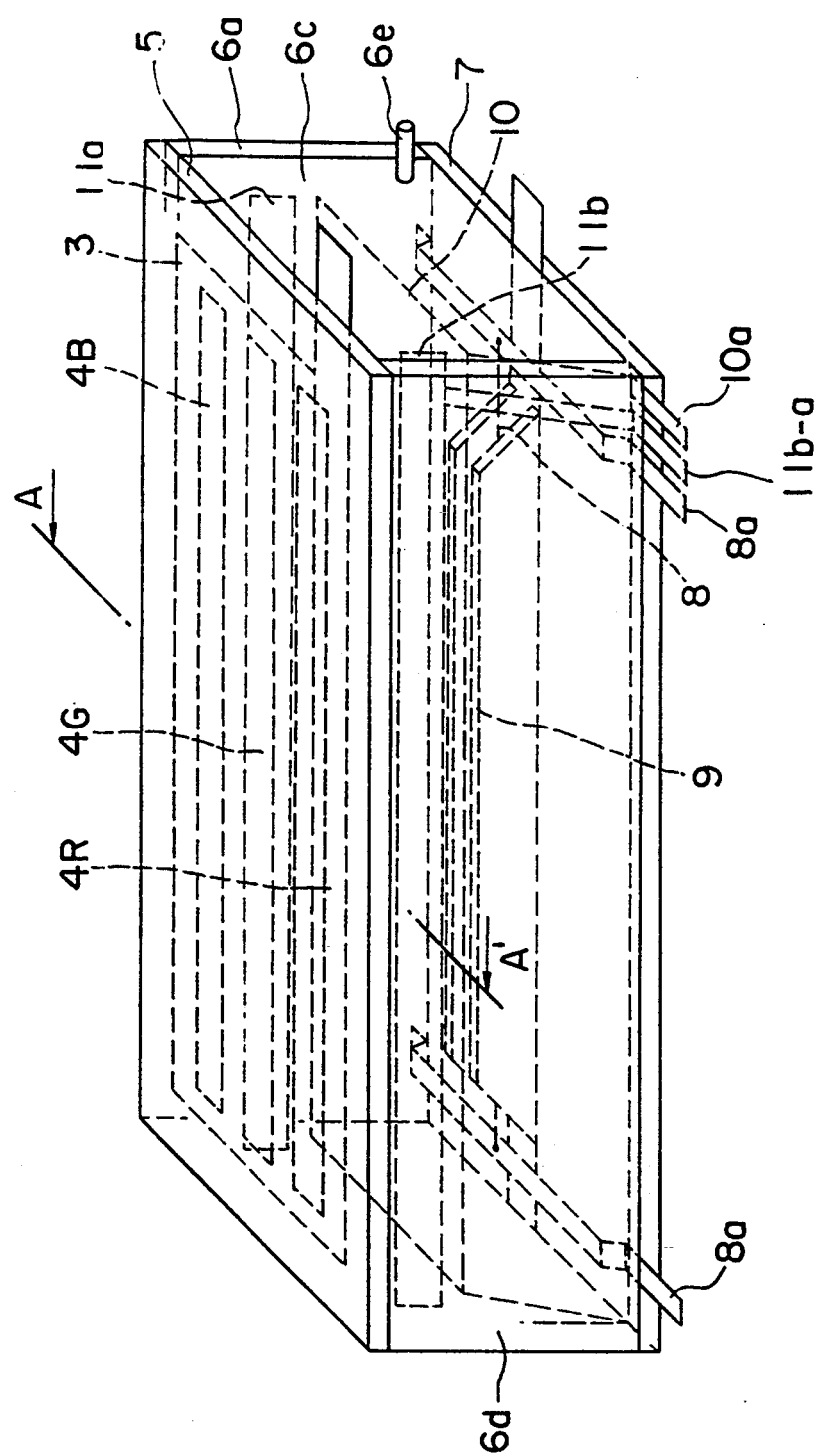
FIG. 4 is a perspective view showing a second embodiment of the illumination unit according to the present invention.
Figure 5:
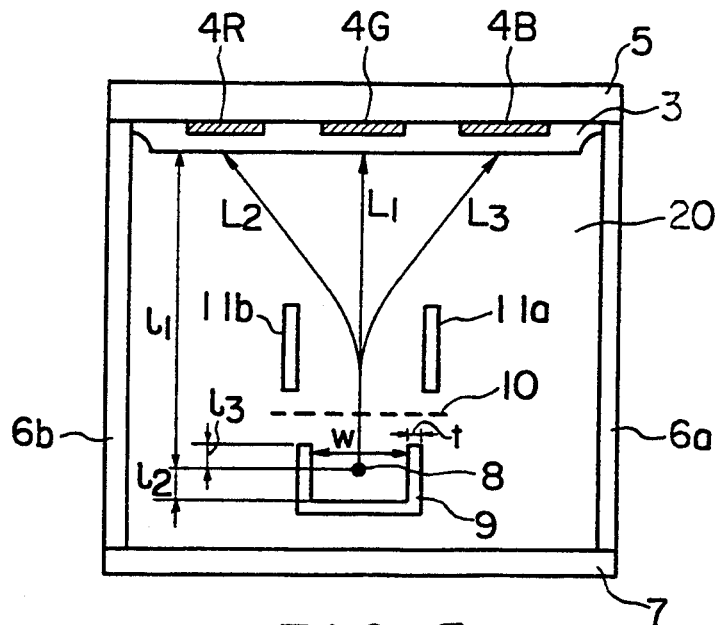
FIG. 5 is a cross-sectional view taken along the line A—A' shown in FIG. 4.

FIG. 4 is a perspective view showing a second embodiment of the illumination unit according to the present invention. FIG. 5 is a cross-sectional view taken along the line A—A' shown in FIG. 4.

In this embodiment, a cathode 8 formed by a single fine wire is so disposed as to be enclosed by a U-shaped back electrode 9. In the same way as in the first embodiment, the fluorescent substance having the width the same as the opening width W of the back electrode 9 can be excited to emit light. In more practical, when the distance between the anode 3 and the cathode 8 is $l_1 = 30$ mm; the distance between the cathode 1 and the back electrode 9 is $l_2 = 0.5$ mm; the distance between the cathode 1 and the opening of the back electrode 9 is $l_3 = 9.5$ mm; the opening width of the back electrode is $W = 5$ mm; and the thickness of the back electrode is $t = 0.5$ mm, the width at which the fluorescent substance emits light is roughly 5 mm.

In this embodiment, a grid 10 is disposed between the opening portion of the back electrode 9 and the anode 3, and further deflection electrodes 11a and 11b are disposed between the grid 10 and the anode 3. The grid 10 is formed of a conductive and non-magnetic material such as stainless steel, brass, aluminum, etc. and formed into a net-shape or a plurality of slit-shaped openings so that the electrons can be passed therethrough.

Figure 6:
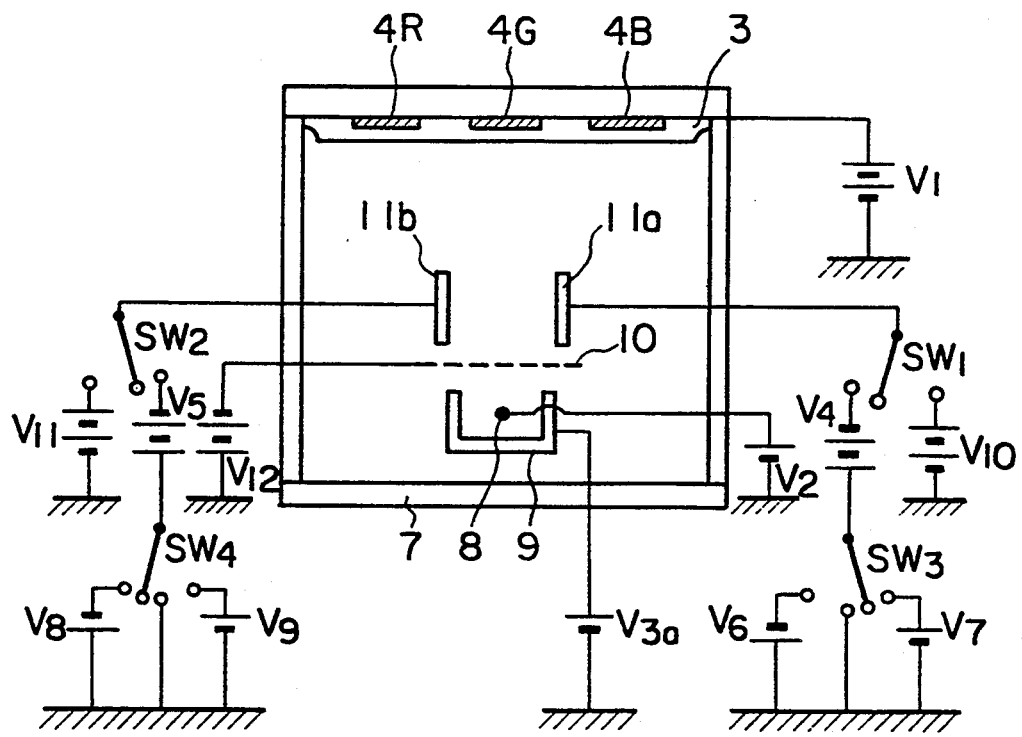
FIG. 6 is a diagram showing a circuit for activating the second embodiment Of the illumination unit.

The operation of this embodiment of the illumination unit will be described hereinbelow. FIG. 6 is a diagram of a circuit for activating the illumination unit. When a negative voltage $V_{12}$ is applied to the grid 10, the grid 10 can control the flow of thermoelectrons, so that it is possible to switch the light emissions of the red fluorescent substance 4R, the green fluorescent substance 4G and the blue fluorescent substance 4B, respectively. In other words, it is possible to control the light emissions of the fluorescent substances under the condition that the voltages are kept applied to the cathode 8 and the anode 3.

A voltage $V_{3a}$ higher than that $V_2$ applied to the cathode 8 is applied to the back electrode 9. Further, a negative voltage can be applied to the back electrode 9. When a negative voltage is applied to the back electrode 9, the emission of the thermoelectrons decrease gradually, and finally reaches a cut-off condition under which no current flows between the cathode 8 and the anode 3. As described above, it is possible to control the flow of thermoelectrons.

The deflection electrodes 11a and 11b disposed between the grid 10 and the anode 3 serve to deflect the thermoelectrons emitted from the cathode 8 and accelerated toward the anode 3 in the horizontal direction on the paper. To explain this by a practical example, when the three of the fluorescent substances 4R, 4G and 4B are all required to be activated simultaneously, appropriate positive voltages $V_{10}$ and $V_{11}$ are applied to the deflection electrodes 11a and 11b through switches $SW_1$ and $SW_2$, respectively. Then the thermoelectrons emitted from the cathode 8 are attracted by the positive electric field formed by the deflection electrodes 11a and 11b, and diffused beyond the opening width W of the back electrode 9 as shown in FIG. 5 to excite the fluorescent substances. In other words, all the three kinds of the fluorescent substances can be excited to emit all the colors simultaneously. Accordingly, since three fluorescent substances emit light simultaneously, the emitted light is white.

When only the green fluorescent substance 4G is required to be excited, appropriate negative voltages $V_4$ and $V_5$ are applied between the ground and the deflection electrodes 11a and 11b through the switches $SW_1$, $SW_2$, $SW_3$, and $SW_4$, respectively. Then, an electrostatic lens can be formed in front of the cathode 8, so that the thermoelectrons converge in the direction L1 to excite only the green fluorescent substance 4G. In the same way, in order to excite only the red fluorescent substance 4R, appropriate negative voltages $V_4$ and $V_5$ are applied to the deflection electrodes 11a and 11b, respectively to form an electrostatic lens in front of the cathode 8 and thereby to converge the thermoelectrons in the direction L2. In addition, a positive voltage $V_7$ is applied to the deflection electrode 11a through the switch $SW_3$ and further a negative voltage $V_8$ is applied to the deflection electrode 11b through the switch $SW_4$ in such a way that the voltages $V_7$ an $V_8$ are superposed upon the voltages $V_4$ and $V_5$, respectively for electrostatic deflection. Therefore, the converged thermoelectrons are bent toward the direction L2 to excite only the red fluorescent substance 4R.

When only the blue fluorescent substance 4B is required to be excited, in the way opposite to the case with the red fluorescent substance 4R, an appropriate negative voltage $V_6$ is applied to the deflection electrode 11a through the switch $SW_3$ and an appropriate positive voltage $V_9$ is applied to the deflection electrode 11b through the switch $SW_4$ so as to be superposed upon the voltages $V_4$ and $V_5$, respectively for electrostatic deflection. Therefore, the converged thermoelectrons are bent toward the direction L3 to excite only the blue fluorescent substance 4B.

As described above, it is possible to control the light emission of the fluorescent substances of three kinds, independently by use of a single cathode, by controlling the light emission operations of the fluorescent substances with the use of the back electrode 9, the grid 10 and the deflection electrodes 11a and 11b. Further, it is possible to control the light emissions of the three fluorescent substances under the condition that voltages are kept applied to the cathode 8 and the anode 3. In addition, in the above-mentioned structure, since the light emissions of the fluorescent substances can be switched on the order of nanosecond unit, it is possible to improve the switching speed of the light emission. Further, in the light emission of the present invention, since the light is emitted by the cathode luminescence light, the quantity of light hardly fluctuates according to change in the ambient temperature, and additionally the starting characteristics of the light emission are excellent. Further, since the quantity of light can be adjusted easily, it is possible to construct various illumination apparatus of a broad range from a large output to a small output.

In the embodiment as described above, although the fluorescent substances for high tension application such as zinc sulfide or rare earth element based substance has been used, the same results can be obtained by fluorescent substance for low voltage application such as zinc oxide based substance which can be excited by application of a low voltage. Further, when white light is required, these fluorescent substances of red, green and blue are mixed and applied under due consideration of the brightness balance.

Further, the illumination unit of the present invention can be used as a light source for a liquid crystal television projector by disposing a liquid crystal at the junction surface with the upper plate 5 of transparent glass. In more detail, it is possible to realize a color display unit by illuminating the back surface of a single monochromatic liquid crystal panel with the illumination unit of the present invention, and by exciting the three primary color fluorescent substances and switching three primary color liquid crystal panels at high speed in time series fashion in synchronism with respect to each other.

Further, it is effective to form a thin film on the inner surface of the vacuum vessel 20 by vapor deposition, so that the inner surface is kept at a constant potential to eliminate the influence of external magnetic field.

Figure 7:
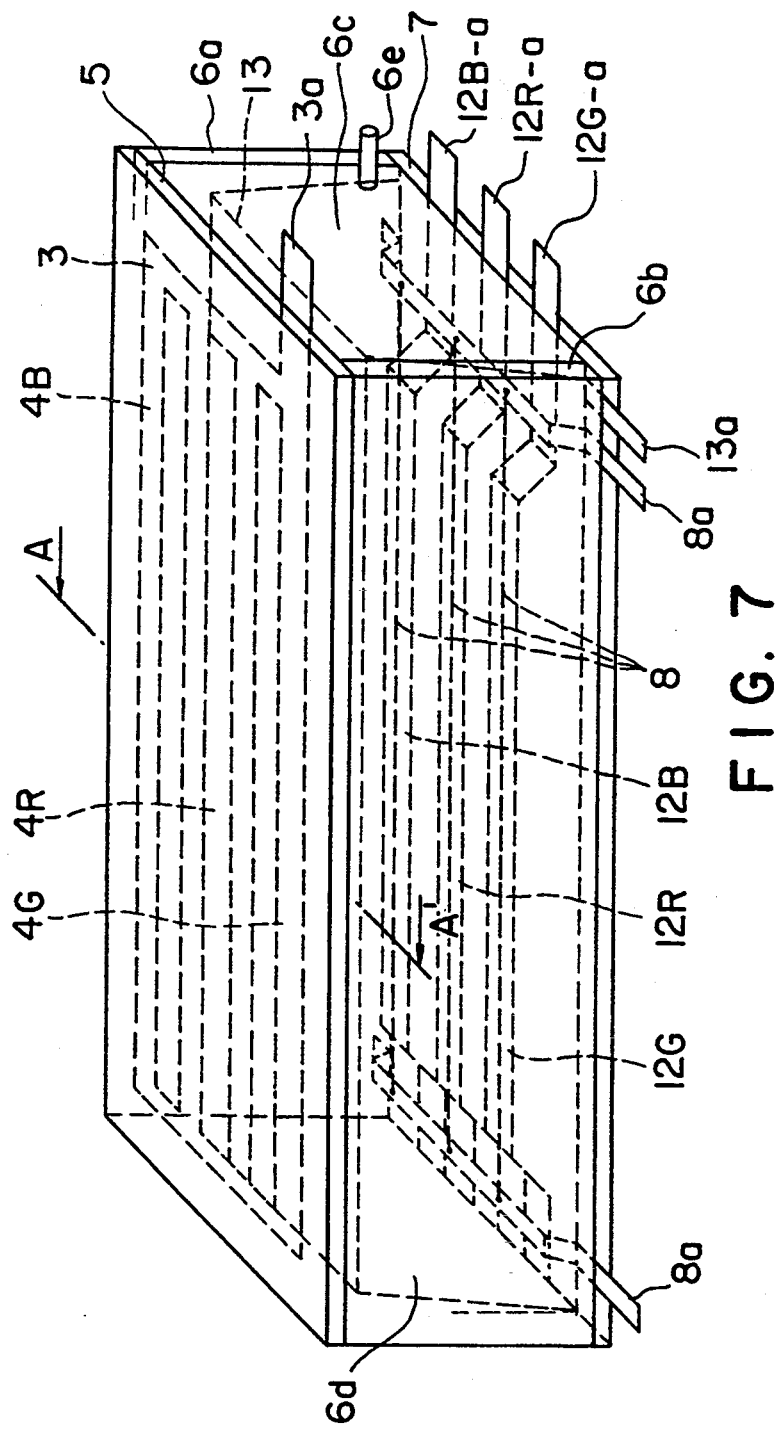
FIG. 7 is a perspective view showing a third embodiment of the illumination unit according to the present invention.

FIG. 7 is a perspective view showing a third embodiment of the illumination unit used for an image reading apparatus according to the present invention, and FIG. 8 is a cross-sectional view taken along the line A—A' in FIG. 7.

In the drawings, a trapezoidal grid 13 constructed by a single element is disposed between three cathodes 8 and an anode 3, and fixed between a bottom glass plate 7 and both end surfaces of two side glass plates 6a and 6b. In the same way as shown in FIG. 1, the cathode is formed by stretching a single cathode wire into S-shape with cathode returning poles.

FIG. 9 is a circuit diagram showing the third embodiment of the illumination unit activating circuit. When voltage $V_{15}$ is applied to the three cathodes 8, the cathodes 8 are heated by Joule heat and therefore the electron emission substances applied to the vicinity thereof are also heated up to 400° to 800° C., into a status where thermoelectrons are emitted easily. Under these conditions, when a positive voltage $V_{13}$ is applied to the grid 13 through a switch $SW_5$, the thermoelectrons are accelerated and emitted toward the grid 13 and further some thermoelectrons are accelerated, being passed through openings of the grid 13, toward the anode 3 by an electric field generated by the anode 3 to which a high tension $V_1$ of 5 to 30 kV, most preferably 10 kV is applied. Then, the thermoelectrons penetrate through the anode 3 to excite the fluorescent substances 4G, 4R and 4B, so that visible light can be emitted.

Here, only the case of the green fluorescent substance 4G will be described hereinbelow by way of example, with reference to FIG. 9. Under the condition that a voltage $V_{15}$ is applied to the cathode 8 and a voltage $V_1$ is applied to the anode 3, a positive voltage $V_{13}$ is applied to the grid 13 via a switch $SW_5$; negative voltages $V_{19}$ and $V_{21}$ are applied to metallic back electrodes 12R and 12B via switches $SW_7$ and $SW_8$ via, respectively; and a potential the same as that of the cathode 8 or a positive voltage $V_{16}$ is applied to a metallic back electrode 12G via a switch $SW_6$. At this time, since the negative voltage is kept applied to the metallic back electrodes 12R and 12B, thermoelectrons are not emitted from the cathode 8 corresponding to these electrodes, so that red light and blue light are not emitted. Accordingly, only the green fluorescent substance 4G is excited and therefore emits green light.

In the same way, when only the red fluorescent substance 4R is required to emit light, negative voltages $V_{17}$ and $V_{21}$ are applied to the metallic back electrodes 12G and 12B via switches $SW_6$ and $SW_8$; and further a potential the same as that of the cathode 8 or a positive voltage $V_{18}$ is applied to a metallic back electrode 12R via a switch $SW_7$. Further, when the blue fluorescent substance 4B is required to emit light, negative voltages $V_{17}$ and $V_{19}$ are applied to the metallic back electrodes 12G and 12R via switches $SW_6$ and $SW_7$; and further a potential the same as that of the cathode 8 or a positive voltage $V_{20}$ is applied to a metallic back electrode 12B via a switch $SW_8$.

Further, the quantity of the electrons emitted from the cathode 8 becomes the maximum when the positive voltages $V_{16}$, $V_{18}$, and $V_{20}$ applied to the back electrodes of the fluorescent substances required to emit light become a voltage the same as that applied to the cathode 8 (in the same potential as that of the cathode 8).

Here, the case where the light emission of the fluorescent substances is controlled by use of only the back electrodes, without use of the grid 13 is taken into account. Under the conditions that the anode voltage is 10 kV; the distance between the cathode and the anode is $l_1 = 21.5$ mm; the distance between the back electrode and the cathode is $l_2 = 0.25$ mm; and the voltage applied to the cathode 8 has been adjusted so that the anode current is 50 µA, in order to reduce the anode current down to zero volts, the negative voltage of about $-300$ V is required to be applied to the back electrodes 12G, 12R and 12B.

In the present invention, however, since the grid 13 is disposed between the anode 3 and the cathode 8 and further a positive grid voltage $V_{13}$ of 2 to 3 V is applied to the grid 13, it is possible to reduce the back electrode voltage for controlling the light emission of the fluorescent substances to such an extent as low as $-50$ V. This is because since the grid 13 is disposed between the cathode 8 and the anode 3, there exists an effect to shield the electric field generated by the high tension applied to the anode 3. Therefore, the mission rate of the thermal electrons from the cathode 8 is dependent upon only the relationship in voltage level between the back electrodes 12G, 12R and 12B, without being subjected to the influence of the voltage of the anode 3.

Further, when no color light is required to be emitted, negative voltages $V_{17}$, $V_{19}$ and $V_{21}$ are applied to the metallic back electrodes 12G, 12R and 12B, respectively, or alternatively a negative voltage $V_{14}$ is applied to the grid 13.

As described above, the electrons emitted from the cathode 8 can be controlled by use only the back electrodes 12G, 12R and 12B or only the grid 13. However, it is possible to control the electron emission by a lower voltage when controlled by use of both the back electrodes 12G, 12R and 12B and the grid 13.

Further, in this embodiment, since the grid 13 is constructed by a single common element, the supporting structure of the grid 13 can be simplified. Further, since the electrons emitted from the cathode 8 cannot reach the anode 3 by passing through portions other than openings of the grid 13, it is possible to allow only the required fluorescent substances to emit required light, without emitting light not required, thus preventing the leakage of the electrons effectively. Therefore, it is possible to control the emission of light of the fluorescent substances 4G, 4R and 4B by the metallic back electrodes 12G, 12R and 12B and the grid 13, under the condition that voltage is kept applied to the cathode 8 and the anode 3. As a result, it is possible to emit light of three primary colors independently from the light emitting sections of a single illumination unit.

Further, in the illumination unit of the present invention, since the cathode luminescence light is emitted, the light emission efficiency is high. For instance, in the case of the green fluorescent substance of ZnS:Cu, Al, when the anode voltage is $V_1 = 8$ kV; and the current density of the electrons emitted onto the fluorescent substance is 50 $\mu A/cm^2$; the brightness is 47,420 $cd/m^2$. Further, when a large quantity of light is required, it is possible to obtain the required quantity of light by increasing the anode voltage and the current density of the electrons emitted onto the fluorescent substance. As a result, it is possible to reduce the light emission area, as compared with the case of the conventional fluorescent lamp, when the same quantity of light is required to be emitted.

Figure 10:
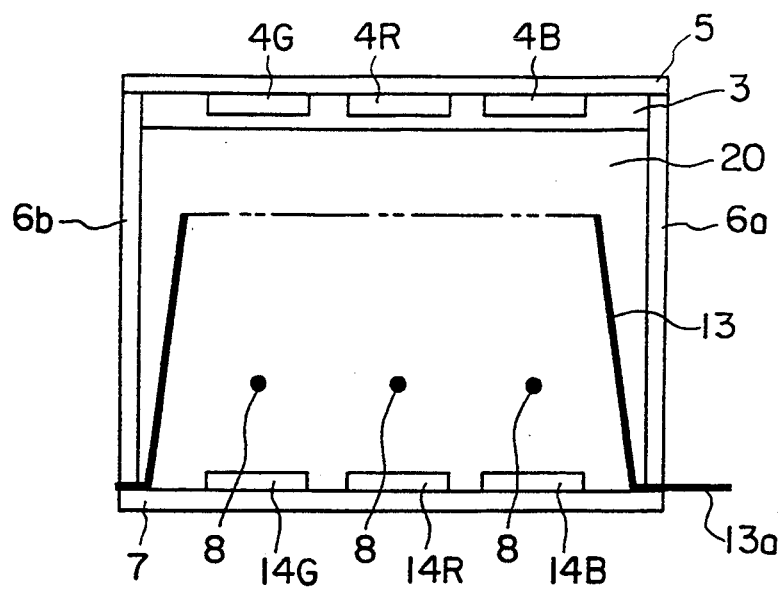
FIG. 10 is a cross-sectional view showing an essential portion of a fourth embodiment of the illumination unit according to the present invention.
Figure 11:
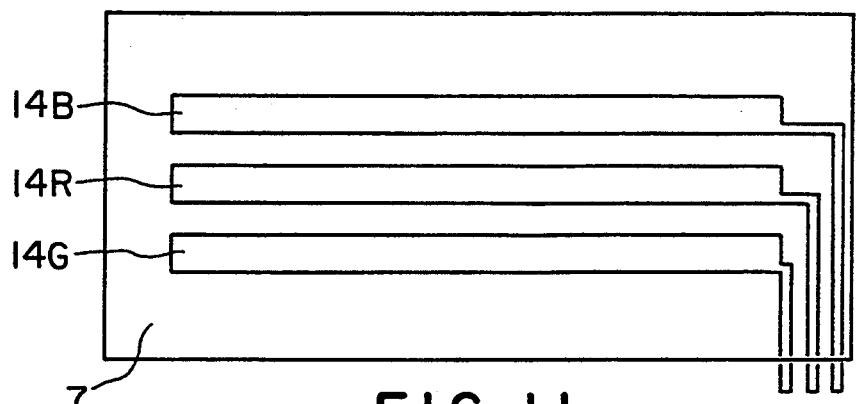
FIG. 11 is a front view showing a back electrode of metal vapor deposition type used in the fourth embodiment.

FIG. 10 is a cross-sectional view showing a fourth embodiment of the present invention, and FIG. 11 is a front view showing the metallic back electrodes of vapor deposition type of the fourth embodiment. A green back electrode 14G of vapor deposition type, a red back electrode 14R of vapor deposition type and a blue back electrode 14B of vapor deposition type are directly formed by selectively depositing a metal such as aluminum on a glass plate 7 into a strip shape by vapor deposition technique. Therefore, it is possible to eliminate the manufacturing process of fixing the back electrodes between the bottom glass plate 7 and the side glass plates 6a and 6b; that is, the back electrodes can be formed easily within the vacuum vessel 20. Further, since the distance between the cathode 8 and the back electrodes 14G, 14R and 14B can be maintained accurately, it is possible to reduce the dispersion of the control voltage applied to the back electrodes 14G, 14R and 14B in order to excite and not to excite the fluorescent substances.

Figure 12:
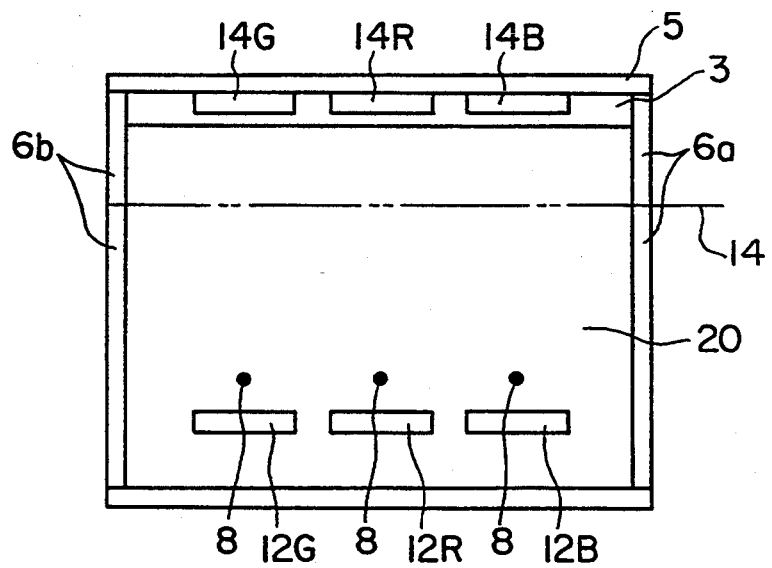
FIG. 12 is a cross-sectional view showing an essential portion of a fifth embodiment of the illumination unit according to the present invention.

FIG. 12 is a cross-sectional view showing a fifth embodiment of the present invention. In this embodiment, a flat plate grid 14 is formed between the cathode 8 and the anode 3, and the grid 14 is fixed between the two divided glass plates 6a and 6b. Therefore, it is possible to eliminate the manufacturing process of bending the grid, and to reduce the material required to form the grid.

Figure 13:
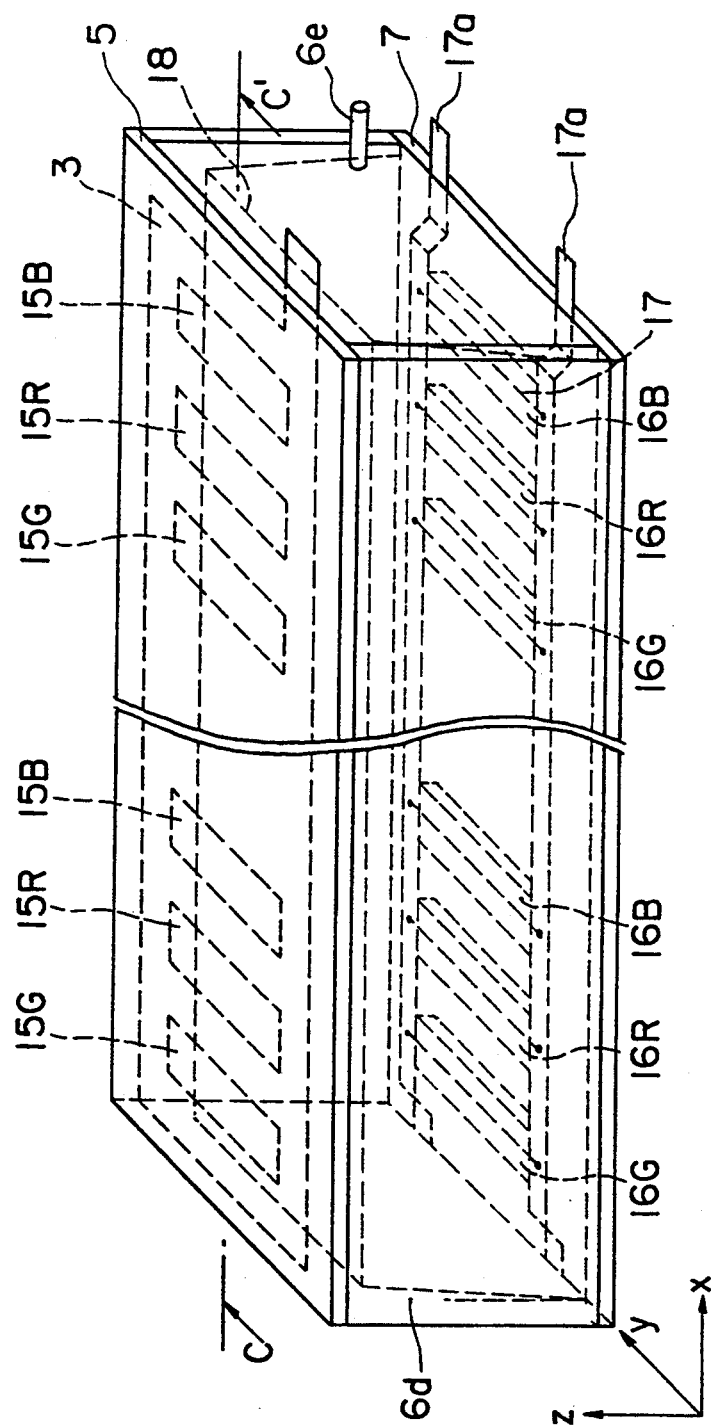
FIG. 13 is a perspective view showing a sixth embodiment of the illumination unit according to the present invention.
Figure 14:
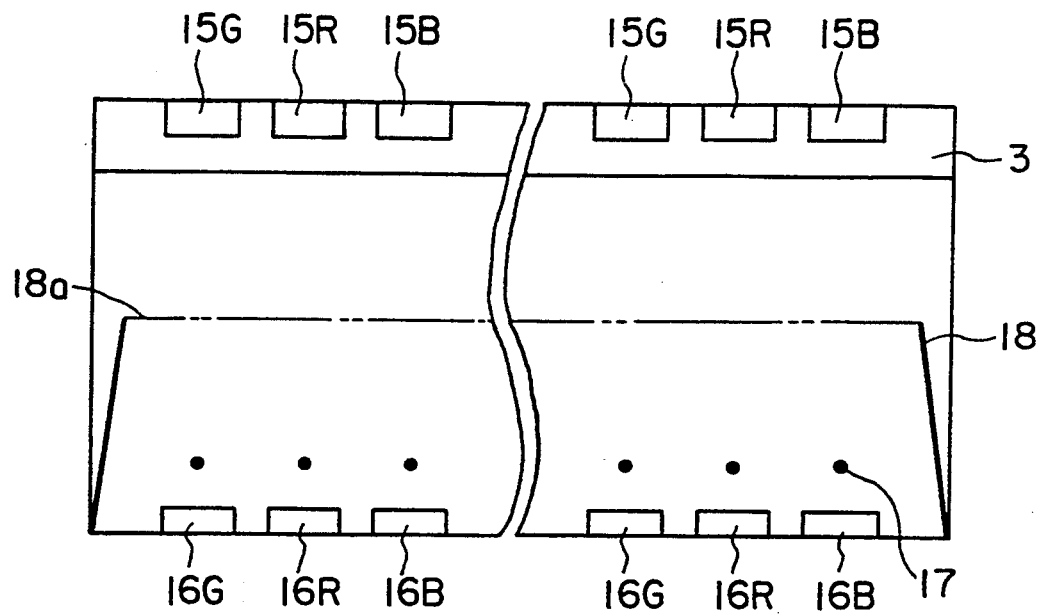
FIG. 14 is a cross-sectional view taken along the line C—C' shown in FIG. 13.

FIG. 13 is a perspective view showing a sixth embodiment of the illumination unit of the present invention. Further, FIG. 14 is a cross-sectional view taken along the line C—C' in FIG. 13, and FIG. 15 is a front view showing a grid electrode 18 shown in FIG. 13.

In FIG. 13, the fluorescent substances 15 are applied onto the inner surface of the upper plate 5 being arranged in the x-axis direction in the order of a green fluorescent substance 15G, a red fluorescent substance 15R, and a blue fluorescent substance 15B. In the same way, the back electrodes 16 of the number same as that of the fluorescent substances are formed on the side of the cathode 17 opposite from the anode 3 in the order of the green back electrode 16G, the red back electrode 16R and the blue back electrode 16B being arranged in the x-axis direction. Further, the cathode 17 is stretched one for each pair of the fluorescent substance and the back electrode, in the Y-axis direction. The grid 18 is formed integrally by etching a plate so as to be formed with a plurality of opening portions 18a of the number same as that of the fluorescent substances, as shown in FIG. 15.

Figure 15:
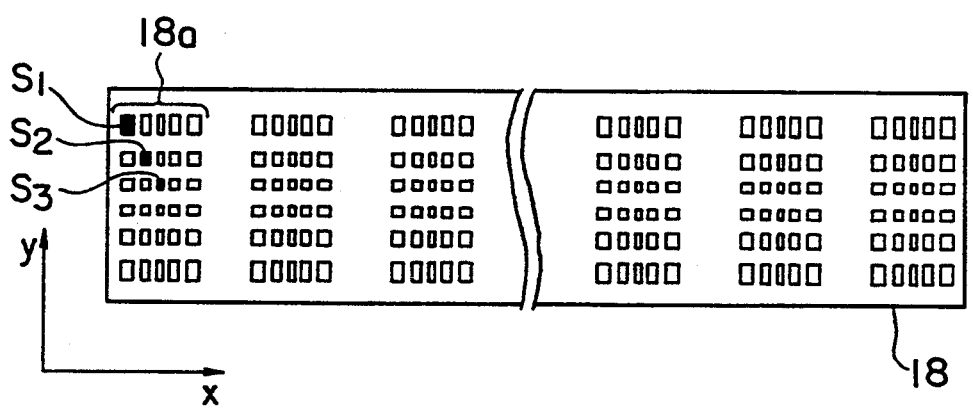
FIG. 15 is a front view showing a grid 18 shown in FIG. 13.

Here, when the light emission is electronically controlled by use of the grid formed with the same opening areas $S_1$, $S_2$, and $S_3$ in the opening portions 18a shown in FIG. 15, the brightness is not uniform over the light emission surface.

The reason why the irregularity occurs in brightness will be described in details hereinbelow. FIG. 16 shows the distribution of the brightness on the light emission surface of the fluorescent substance 15G electronically controlled by use of a grid electrode 19 formed with the openings of the same opening areas $S_1$, $S_2$, and $S_3$. When the cathode 17 is heated, although the thermoelectrons 22 are generated, since the vicinities of both end portions $P_S$ of the cathode 17 are in contact with cathode fixing members 21, the generated heat is easily conducted outside. In other words, the temperature is high at the central portion $P_C$ and low at both end portions $P_S$, so that there exists a difference in temperature between the central portion $P_C$ and both the end portions $P_S$. As a result, the quantity of the thermoelectrons 22 emitted from the cathode 17 is large at the central portion $P_C$ and small at both the end portions $P_S$. Therefore, under these conditions, when thermoelectrons 22 are irradiated upon the fluorescent substances by electronically controlling the light emission by use of the grid 19 formed with the same opening areas $S_1$, $S_2$, and $S_3$, the brightness $L_C$ at the central portion $P_C$ is higher than the brightness $L_S$ at the end portions $P_S$. As a result, the brightness is not uniform, so that the central portion of the fluorescent substance deteriorates earlier as compared with the other portions. In FIG. 16, the brightness irregularity in the y-axis direction in FIG. 13 has been explained by way of example. However, the same brightness irregularity occurs in the x-axis direction in FIG. 13.

Therefore, in this embodiment, as shown in FIG. 15, the opening area $S_1$ at the end of the opening portion 18a is made larger; and the more the opening areas $S_2$ and $S_3$ of the opening portion 18a reach the central position of the opening portion 18a, the smaller will be made the opening area of the opening portion 18a. When this grid 18 is electronically controlled, instead of the grid 19 formed with the opening portions of the same opening areas as shown in FIG. 16, it is possible to pass a small amount of the thermoelectrons 22 through the grid at the central portion where the quantity of the thermoelectrons is large, and to pass a large amount of thermoelectrons 22 through the grid at both the end portions where the quantity of the thermoelectrons is small. In other words, it is possible to make uniform the quantity of the thermoelectrons 22 to be passed through the grid 18 over the grid, by adjusting the opening area of the opening portion 18a of the grid 18, as shown in FIG. 15. As a result, the current density of the thermoelectrons irradiated upon the fluorescent substance can be made uniform, so that it is possible not only to eliminate the irregular brightness on the light emission surface both in the x- and y-axis directions in FIG. 15, but also to prevent the partial deterioration of the fluorescent substance.

FIG. 17 is a front view showing a seventh embodiment of a grid 23 of the present invention. The opening portion 23a of the grid 23 is formed into such a hexagonal bow-tie-shape that the width $h_2$ at the central portion is smaller than the width $h_1$ at both the end portions, and further the opening area of the opening portions 23a are formed so as to become smaller in the same shape in arrangement toward the central line D—D' of the grid 23. Owing to the structure as described above, it is possible not only to prevent the irregular brightness in both the x- and y-axis directions in FIG. 15, but also to simplify the manufacturing processing of forming the opening portions, as compared with the case where a large number of small opening portions as shown in FIG. 15 are to be formed. In addition, there exists another effect such that the quantity of the thermoelectrons blocked by the grid 23 can be reduced, as compared with the case of the grid 18 shown in FIG. 15.

Figure 18:
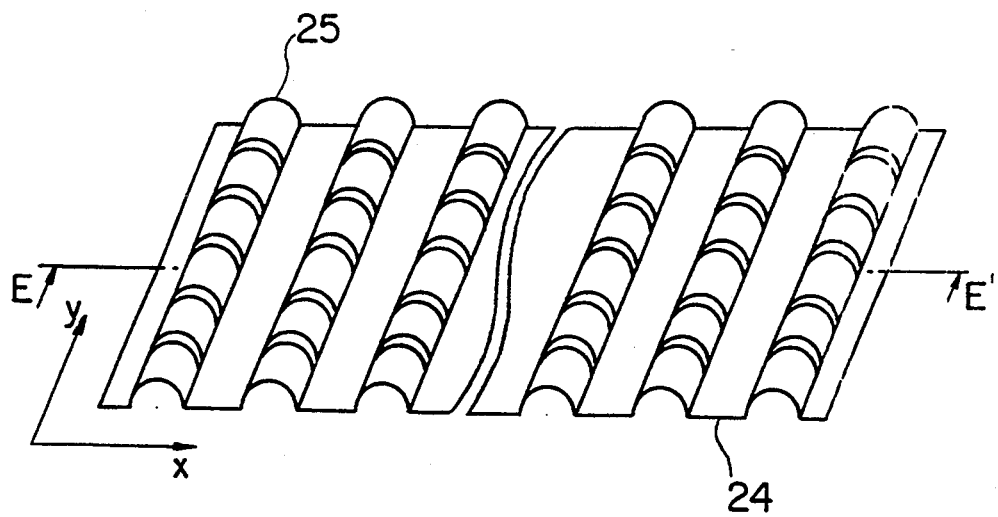
FIG. 18 is a perspective view showing a grid 24 of an eighth embodiment of the illumination unit according to the present invention.
Figure 19:
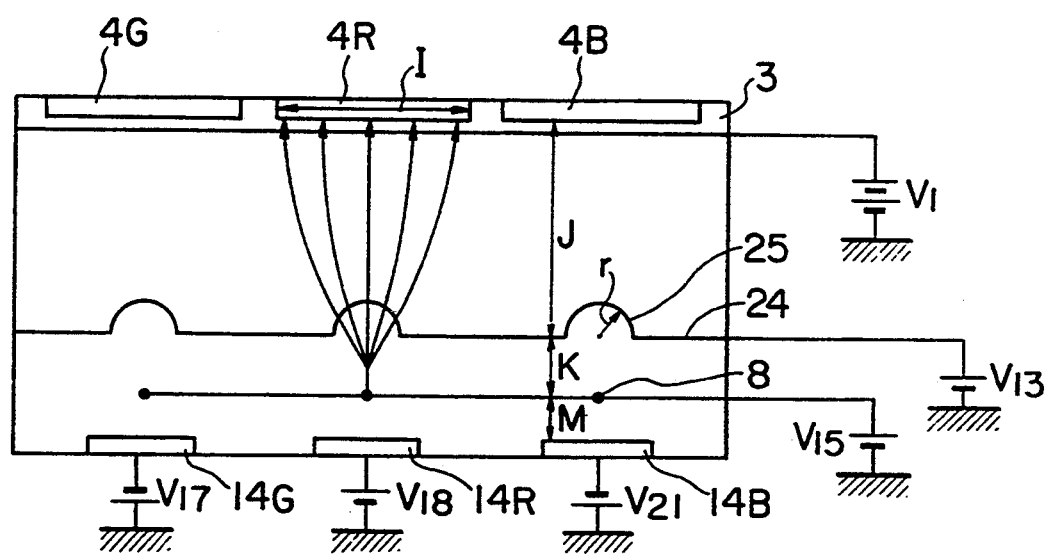
FIG. 19 is a diagram showing a circuit for activating the eighth embodiment of the illumination unit, together with a diagrammatical cross-sectional view taken along the line E—E' shown in FIG. 18.

FIG. 18 is a perspective view showing an eighth embodiment of the grid 24 of the present invention, and FIG. 19 is circuit diagram for activating the illumination unit, together with a cross-sectional view taken along the line E—E' shown in FIG. 18. In this embodiment, the grid 24 is formed into a semi-cylindrical shape expanded toward the anode 3.

The case where only the red fluorescent substance 4R is activated is taken into account, by way of example. Under the condition that a positive voltage $V_1$ is applied to the anode 3; a positive voltage $V_{18}$ is applied to the back electrode 14R; and further a positive voltage $V_{13}$ is applied to the grid 24, thermoelectrons are emitted toward the grid 24 and reach the grid 24. Some of them pass through the opening portion 25 of the grid 24, accelerated toward the anode 3 to which a positive voltage $V_1$ is applied, and pass through the anode 3 to excite the fluorescent substance 4R, so that red light is emitted. At this time, negative voltages $V_{17}$ and $V_{21}$ are applied to the back electrodes 14G and 14B in order not to excite the fluorescent substances 4G and 4B.

In an experiment, the width I of the red light emission on the fluorescent substance 4R is about I=2.4 mm, under the condition that $V_1$=8 kV; $V_{13}$=5 V; $V_{15}$=3.3 V; $V_{18}$=5 V; $V_{17}$=−10 V; $V_{21}$=−10 V; the distance between the fluorescent substance 4R and the grid 24 is J=5.4 mm; the distance between the grid 24 and the cathode is K=2.4 mm; the distance between the cathode 8 and the back electrode 14R is M=1.2 mm; and the radius r of the semi-cylindrical portion of the opening portion 25 is r=0.4 mm.

The above-mentioned experiment indicates that since the opening portion 25 of the grid 24 is formed into a semi-cylindrical shape, the thermoelectrons are attracted in the x- and y-axis directions in FIG. 18, with the result that it is possible to irradiate electrons upon the fluorescent substance 14R uniformly over a width (2.4 mm) wider than the opening width 2r (=0.8 mm) of the opening portion 25 of the grid 24, thus preventing the irregular brightness.

In addition, the above-mentioned method is effective in that it is possible to prevent the electron leakage to the adjacent light emission area and further to secure a sufficient light emission width.

Further, when the shape of the opening area of the opening portion 25 is formed into a bow-tie shape as with the case of the seventh embodiment, it is possible to prevent the irregular brightness in the x- and y-axis directions, simultaneously.

Figure 20:
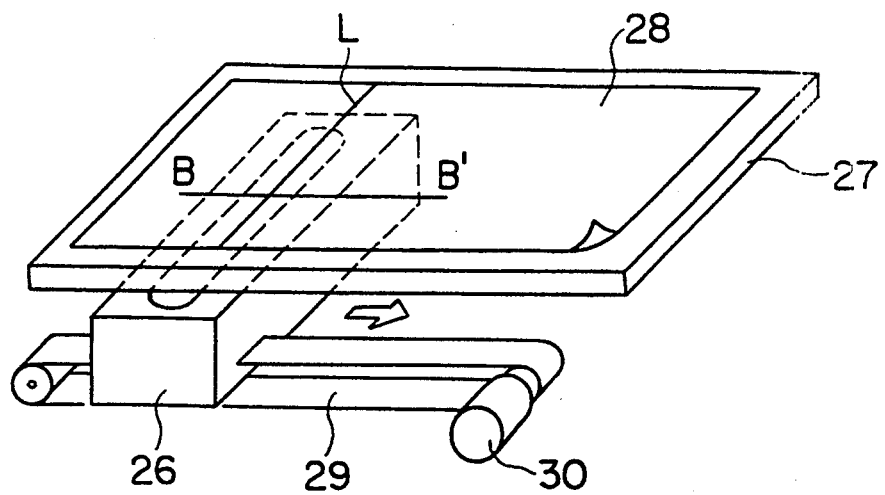
FIG. 20 is a perspective view showing an embodiment of the image reading apparatus using the illumination unit according to the present invention.
Figure 21:
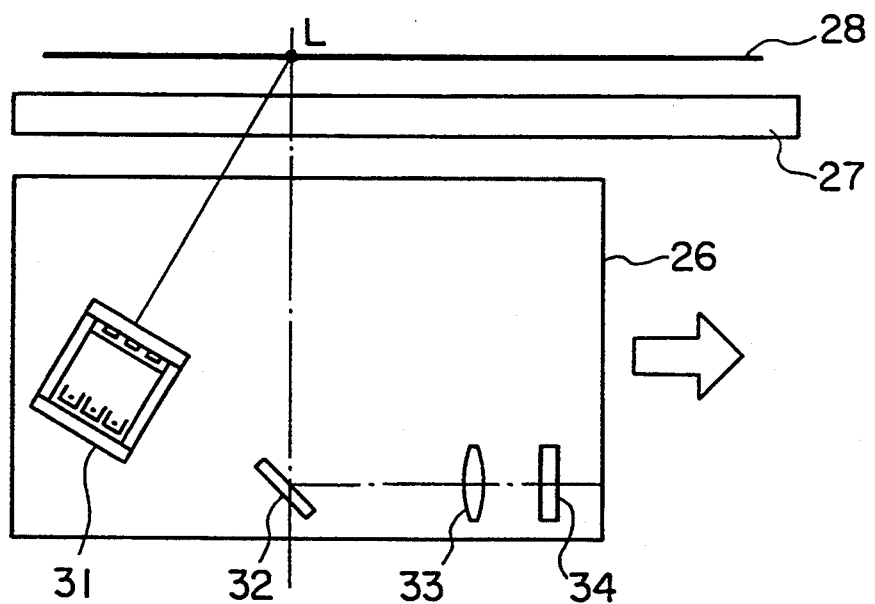
FIG. 21 is a cross-section view showing a carriage 26 shown in FIG. 20.

FIG. 20 is a perspective view showing an embodiment of the image reading apparatus of the present invention, and FIG. 21 is a cross-sectional view showing a carriage 26 shown in FIG. 20, taken along the line B—B' in FIG. 20. The operation of reading an image will be described hereinbelow with reference to FIGS. 20 and 21.

Within the carriage 26, an illumination unit 31 the same in construction as the embodiment of the present invention shown in FIG. 1 is mounted to emit light upon a part of the row L of an object 28 to be image-read and placed on a glass base 27. The emitted light is reflected from the object 28 and the reflected scattered light is image-formed onto the CCD 34 of the light-electricity transducing element through a mirror 32 and a reduction lens 33. The CCD 34 is of linear image sensor type, and image data corresponding to only one row can be read by an electric circuit not shown.

To read color image, the following procedure is taken. Without moving the carriage 26, first the green fluorescent substance 4G is excited, and the component of the green light reflected from the object 28 is read by the CCD 34; next the red fluorescent substance 4R is excited, and the component of the red light reflected from the object 28 is read by the CCD 34; and further the blue fluorescent substance 4B is excited, and the component of the blue light reflected from the object 28 is read by the CCD 34, so that three primary color components of the object 28 can be obtained.

Successively, the carriage on which the illumination unit 31, the mirror 32, the reduction lens 33 and the CCD 34 are all fixed is moved by a distance corresponding to the image reading resolving power, in the arrow direction by a driving device 30 through a timing belt 29. By repeating the above-mentioned operation, the whole surface of the object 28 can be image-read.

In the illumination unit of the present invention, since the colors of the emitted light can be switched at high speed, it is possible to read image of the object 28 by moving the carriage only once; that is, in linear sequence mode.

Further, in FIG. 21, although the first embodiment of the illumination unit shown in FIG. 1 is adopted, it is of course possible to mount another embodiment on the carriage 26.

Figure 22:
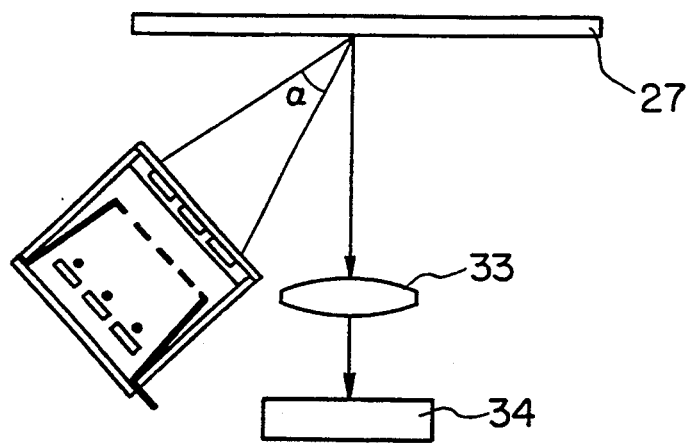
FIG. 22 is a perspective view showing another embodiment of the image reading apparatus using the illumination unit according to the present invention.
Figure 23:
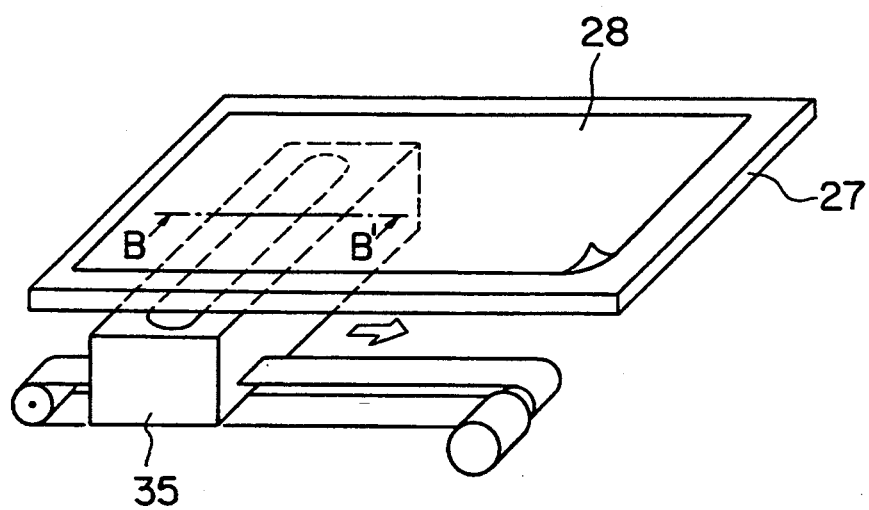
FIG. 23 is a perspective view showing a prior art image reading apparatus.
Figure 24:
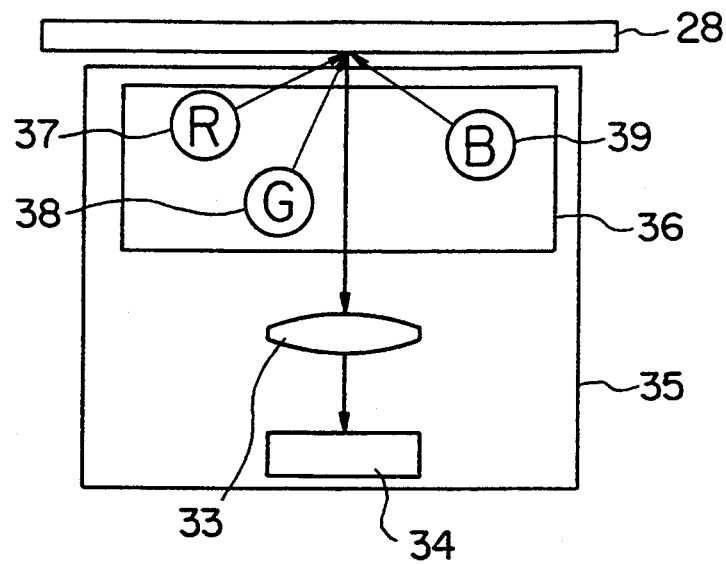
FIG. 24 is a cross-section view showing the carriage 35, taken along the line B—B' shown in FIG. 23.
Figure 25:
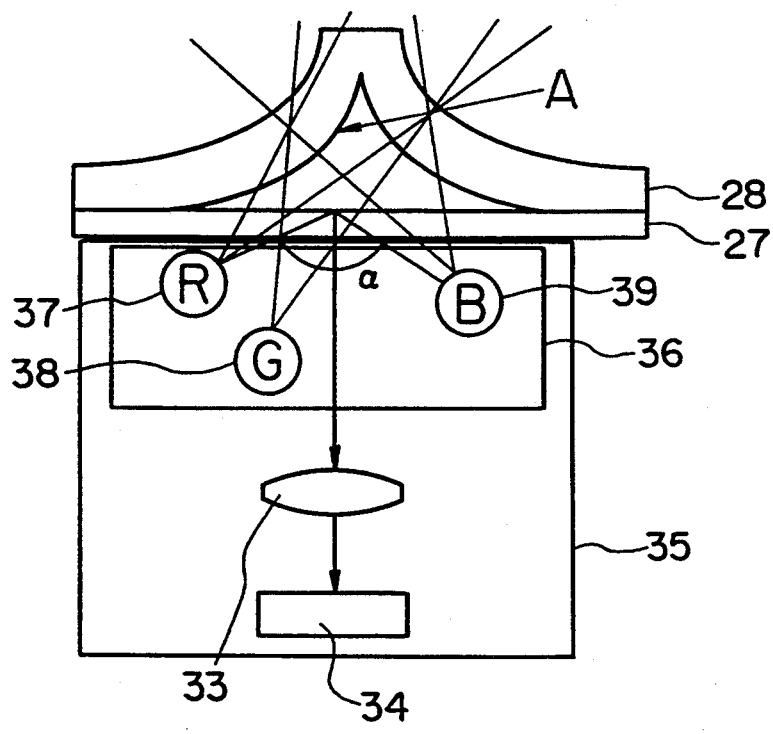
FIG. 25 is an illustration for assistance in explaining the case where an image having sloped portions such as an opened book is read in accordance with the prior art method.

FIG. 22 is an illustration showing the case where the illumination unit shown in FIG. 7 is mounted on the image reading apparatus. As already described, since the light emission area required to secure the same quantity of light can be narrowed, in the case where the light emission width for each color is 1.5 mm; the light emission width for three colors is 6 mm; and the distance between the light emission plane and the image is 16 mm, the spread angle a obtained when seeing the illumination unit from a point on the object 28 to be image read is about 20 degrees, which is about one-sixth of the conventional spread angle of about 120 degrees as already explained with reference to FIG. 25, and thereby it is possible to prevent a shear in color image reading.

Here, the case is taken into account where the illumination unit shown in FIG. 13 is mounted on the image reading apparatus in the same way as with the case shown in FIG. 22. In this case, the illumination unit is so arranged that the x-axis direction shown in FIG. 13 corresponds to the vertical direction with respect to the paper surface in FIG. 22. Under these conditions, the fluorescent substance is arranged in the x-axis direction in FIG. 13, but in the vertical direction with respect to the paper surface in FIG. 21. Therefore, in this case, the spread angle a of the three color lights from the image is zero in FIG. 22, with the result that there exists a prominent effect such that it is possible to perfectly eliminate a shear in image reading.

Further, in the illumination unit of the present invention, since only a single high tension anode power source of large volume is required, it is possible reduce the volume of the carriage when the illumination unit of the present invention is assembled with the image reading apparatus together with the illumination activating circuit. As a result, it has become possible to reduce the volume of the image reading apparatus using the illumination unit according to the present invention.

In addition, In this embodiment, since the illumination unit is small in size and high in output power, when this illumination unit is incorporated in the image reading apparatus, it is possible to realize a high speed and high resolving power image reading apparatus. In the present image reading apparatus, in general there is now being adopted a line sensor of integration type which can generate a sensor output proportional to the integrated value of the quantity of light irradiated upon an object within an accumulation time. In other words, since the quantity of light sensed by the line sensor increases with increasing quantity of light emitted from the illumination unit to the object to be image read, in the illumination unit of the present invention, it is possible to shorten the accumulation time of the line sensor. As a result, the image reading time can be reduced and therefore the image reading speed can be increased in the image reading apparatus. Therefore, the illumination unit of the present invention can solve a problem as to slow image reading speed, which is one of the major problems involved in the current image reading apparatus.

According to the present invention, when a voltage is applied to the cathode placed within the air-tightly closed vacuum vessel, electrons are emitted therefrom. The emitted electrons are further accelerated by a high tension applied to the anode and brought into collision against the fluorescent substances for emitting cathode luminescence light.

Further, in the present invention, the travel direction of the electrons emitted from the cathode can be deflected by the deflection electrodes so as to be directed to any given fluorescent substances.

Further, in the present invention, the quantity of electrons emitted from the cathode can be controlled by the control electrodes. In addition, the emission area of the electrons emitted from the cathode can be controlled by the control electrodes.

As described above, in the present invention, since the illumination unit emits light on the basis of the light emission principle of cathode luminescence, it is possible to provide an illumination unit stable in the quantity of light, without being susceptible to change in the ambient temperature. Further, it is possible to provide an illumination unit compact in size and large in light output.

Further, it is possible to provide a compact illumination unit for emitting three-primary color light by a single cathode so as to be controllable independently.

Further, in the image reading apparatus using the illumination unit according to the present invention, since the illumination unit emits light on the basis of the principle of cathode luminescence, the light emission is excellent in starting characteristics and stable in the quantity of light, thus providing a high performance image reading apparatus.

Further, according to the present invention, since the electrons for exciting a plurality of the fluorescent substances are controlled by a single grid and a plurality of back electrodes within the light emission tube, it is possible to provide an illumination unit which can emit light of three-primary colors independently by the light emitting portion of a single illumination unit, and therefore it is possible to provide an image reading apparatus free from a shear in the color image reading operation and high in color reproducibility, even in the case where objects to be image read have stepped portions such as when a book is opened.

I claim:

1. An illumination unit which comprises:
   a cathode bridged over a bottom of a vacuum vessel, for emitting electrons by application of a first predetermined voltage;
   a grid electrode having opening portions separated by predetermined distances, the opening portions having different opening areas in a direction in which said cathode is bridged;
   an anode for accelerating the electrons emitted by said cathode and having passed through the opening portions of the grid electrode by application of a second voltage higher than the first voltage; and
   a fluorescent substance for emitting cathode luminescence caused by collision of the accelerated electrons thereagainst, all the elements being disposed within an air-tightly closed vacuum vessel.

2. The illumination unit of claim 1, which further comprises a control electrode for controlling a quantity of electrons emitted from said cathode by application of a predetermined voltage higher than the first voltage but lower that the second voltage.

3. An image reading apparatus comprising the illumination unit as claimed in claim 1.

4. The illumination unit of claim 1, wherein said opening areas become smaller as closer to a center of said cathode in the direction in which said cathode is bridged.

5. The illumination unit of claim 1, wherein said grid electrode is applied with a predetermined voltage higher than the first voltage but lower than the second voltage, thus controlling a quantity of electrons to be accelerated by said anode.

* * * * *